Patented Feb. 18, 1947

2,416,024

UNITED STATES PATENT OFFICE 2,416,024

ALIPHATIC 2-OXA-1,5-PENTANEDIOL DIESTERS

Murray Senkus, Terre Haute, Ind., assignor to Commercial Solvents Corporation, Terre Haute, Ind., a corporation of Maryland No Drawing. Application June 2, 1944, Serial No. 538,562

4 Claims. (Cl. 260—488)

My invention relates to novel 2-oxa-1,5-pentanediol aliphatic diesters which can be produced by the reaction of aliphatic acid anhydrides with certain dioxanes in accordance with the following equation:

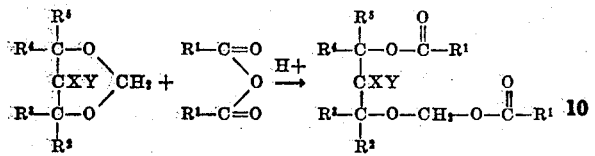

In the formulas appearing above $R^1$ represents an alkyl group; $R^2$, $R^3$, $R^4$ and $R^5$ are substituents selected from the group consisting of hydrogen and alkyl; X is a member selected from the group consisting of hydrogen and alkyl, and Y is a member selected from the group consisting of hydrogen and a nitro group.

The chief products produced by the above reaction are the diesters of 2-oxa-1,5-pentanediols. There are also formed in varying proportions, depending upon the cyclic formal concerned, equivalent amounts of diesters of 1,3-propanediols and 2,6-dioxaheptanediols. Thus, some 1,3-dioxanes yield besides the 2-oxa-1,5-pentanediol diesters small amounts of 1,3-propanediol diesters and 2,6-dioxa-1,7-heptanediol diesters. Moreover, it will be readily recognized that in instances where the substituents R in the first formula shown, do not have the same value throughout the molecule, there exists the possibility of producing one of two possible structural isomers or a mixture which consists of both. For example, in the case of the products obtainable from the action of acetic anhydride on 4,4,6-trimethyl-1,3-dioxane it may be seen from the structure of the ester produced that either the formation of one of two structural isomers or a mixture of these isomers is possible as evidenced by the following equation:

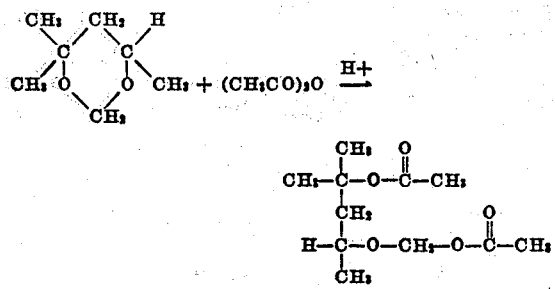

or

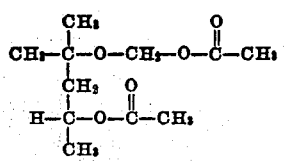

One of the particularly surprising features of the process of my invention is the fact that only the cyclic formals when reacted with a suitable aliphatic anhydride are capable of producing the diesters of the aliphatic 2-oxapentanediols. Cyclic acetals formed from the higher aldehydes, such as acetaldehyde, butyraldehyde, and the like, when treated with acetic or similar anhydrides, yield only the plain diester, the acid corresponding to the anhydride, and a tar.

In practicing the process of my invention, a mixture consisting of cyclic formal, acid anhydride, and from about 1 to 5 per cent of a strong acid catalyst is heated until the esterification appears to be complete. Thereafter a relatively small amount of a soluble salt of an aliphatic acid, preferably corresponding to the particular anhydride employed, is added to the solution and is converted by the action of the strong acid catalyst, into a less ionized aliphatic acid thereby reducing the acidity of the reaction medium and preventing decomposition of the diester on subsequent distillation of the crude mixture. The latter is then filtered, the filtrate distilled under reduced pressure, and the purified diester collected.

In effecting the reaction described above, I have generally found it preferable to utilize a slight molecular excess of the acid anhydride. If the esterification appears to be somewhat sluggish, the reaction can generally be satisfactorily remedied by increasing slightly the amount of acid catalyst. As examples of catalyst that I have found suitable for use in my process, there may be mentioned p-toluenesulfonic acid, sulfuric acid, hydrochloric acid, and the like.

Cyclic formals which may be employed in carrying out my invention include 5-nitro-5-ethyl-1,3-dioxane, 4,4,6-trimethyl-1,3-dioxane, 5,5-dimethyl-1,3-dioxane, 5-hydroxy-1,3-dioxane, 1,3-dioxane, 5-nitro-1,3-dioxane, and the like.

In general, it may be said that any aliphatic acid anhydride will be found operative in my process under the conditions herein set forth, and therefore, I do not desire to be restricted to the particular acid anhydrides utilized in preparing the specific diesters mentioned below. Acid anhydrides suitable for use in my process include acetic anhydride, propionic anhydride, butyric anhydride, valeric anhydride, stearic anhydride, and the like.

My invention may be more specifically illustrated by the following examples.

Example I

A mixture consisting of 322 g. of 5-nitro-5-ethyl-1,3-dioxane, 204 g. of 95 per cent acetic anhydride, and two drops of sulfuric acid was heated on a steam bath for three hours and thereafter was allowed to stand at room temperature over night. The mixture was then rectified through a short Vigreux column. As a result of this distillation operation, there was obtained 89 g. of material boiling up to 133° C. (1 mm.) and 395 g. of 4-nitro-4-ethyl-2-oxa-1,5-pentanediol diacetate boiling at 133° C. (1 mm.). A 79 per cent conversion of the desired ester was obtained.

Analysis: Calculated for $C_{10}H_{17}NO_7$—N, 5.32; found—N, 5.77; $d_{20}^{20}$, 1.1949; $n_D^{20}$, 1.4449.

Example II

To 352 g. of 1,3-dioxane, was added 430 g. of 95 per cent acetic anhydride and 0.4 g. of sulfuric acid. The temperature of the mixture rose to 115° C. in approximately three minutes. Thereafter the reaction mixture was heated on a steam bath for one hour after which time it was allowed to stand at room temperature for 15 hours. One g. of sodium acetate was then added to the solution and the mixture distilled through an efficient fractionating column. There was obtained, as a result of this distillation operation, 53 g. of a liquid having a boiling point of 91–92° C. (10 mm.) and a saponification equivalent of 81 which compares favorably with the saponification value of 80 for trimethylene diacetate. The distillation also yielded 595 g. of 2-oxa-1,5-pentanediol diacetate boiling at 121–122° C. (10 mm.) and 50 g. of a liquid boiling at 145–147° C. (10 mm.). Carbon and hydrogen analysis on the latter liquid indicated that it was 2,6-dioxa-1,7-heptanediol diacetate. The desired compound, 2-oxa-1,5-pentanediol diacetate was obtained in a conversion of 78 per cent and analyzed as follows:

Analysis: Calculated for $C_8H_{14}O_5$—C, 50.52; H, 7.37; found—C, 50.82; H, 7.34; $d_{20}^{20}$, 1.1032; $n_D^{20}$, 1.4237.

Included in the table which follows is a group of compounds prepared in accordance with the procedures outlined above together with certain physical properties of such compounds.

Table

| Ester | Analysis | | | | Boiling point °C. (mm.) | $d_{20}^{20}$ | $n_D^{20}$ |
|---|---|---|---|---|---|---|---|
| | C | | H | | | | |
| | Calcd. | Found | Calcd. | Found | | | |
| 3,5,5-trimethyl-2-oxa-1,5-pentanediol diacetate or 3,3,5-trimethyl-2-oxa-1,5-pentanediol diacetate or a mixture of the two above compounds | 56.85 | 56.81 | 8.61 | 8.37 | 112–114(3) | 1.0414 | 1.4306 |
| 3,4-dimethyl-2-oxa-1,4-butanediol diacetate | 52.98 | 53.01 | 7.90 | 7.98 | 111(10) | 1.0676 | 1.4212 |

The diesters of aliphatic 2-oxa-1,5-pentanediols of my invention are, in general, clear water-white mobile liquids having a pleasant ester-like odor. Such compounds serve as solvents for cellulosic as well as numerous other types of film-forming materials. Additional uses of these compounds will be evident to those skilled in the art.

My invention now having been described, what I claim is:

1. As new compositions of matter, 2-oxa-1,5-pentanediol aliphatic diesters having the following general formula:

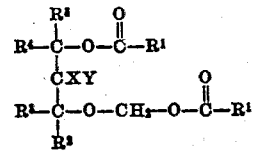

wherein $R^1$ is an alkyl group; $R^2$, $R^3$, $R^4$ and $R^5$ are substituents selected from the group consisting of hydrogen and alkyl; X is a member selected from the group consisting of hydrogen and alkyl; and Y is a member selected from the group consisting of hydrogen and a nitro group.

2. 2-oxa-1,5-pentanediol diacetate.
3. 4-nitro-4-ethyl-2-oxa - 1,5, - pentanediol diacetate.
4. 3-methyl-2-oxa-1,5-pentanediol dibutyrate.

MURRAY SENKUS.

REFERENCES CITED

The following references are of record in the file of this patent:

UNITED STATES PATENTS

| Number | Name | Date |
|---|---|---|
| 2,377,878 | Gresham | June 12, 1945 |
| 2,298,186 | Woodhouse et al. | Oct. 6, 1942 |
| 2,283,764 | Resenbach et al. | May 19, 1942 |

OTHER REFERENCES

Maclead "Jour. Chem. Soc." (London) (1928) p. 3092.